Feb. 28, 1939.  W. H. HUNT  2,149,022
FISH FILLETING MACHINE
Filed April 2, 1937  4 Sheets-Sheet 1
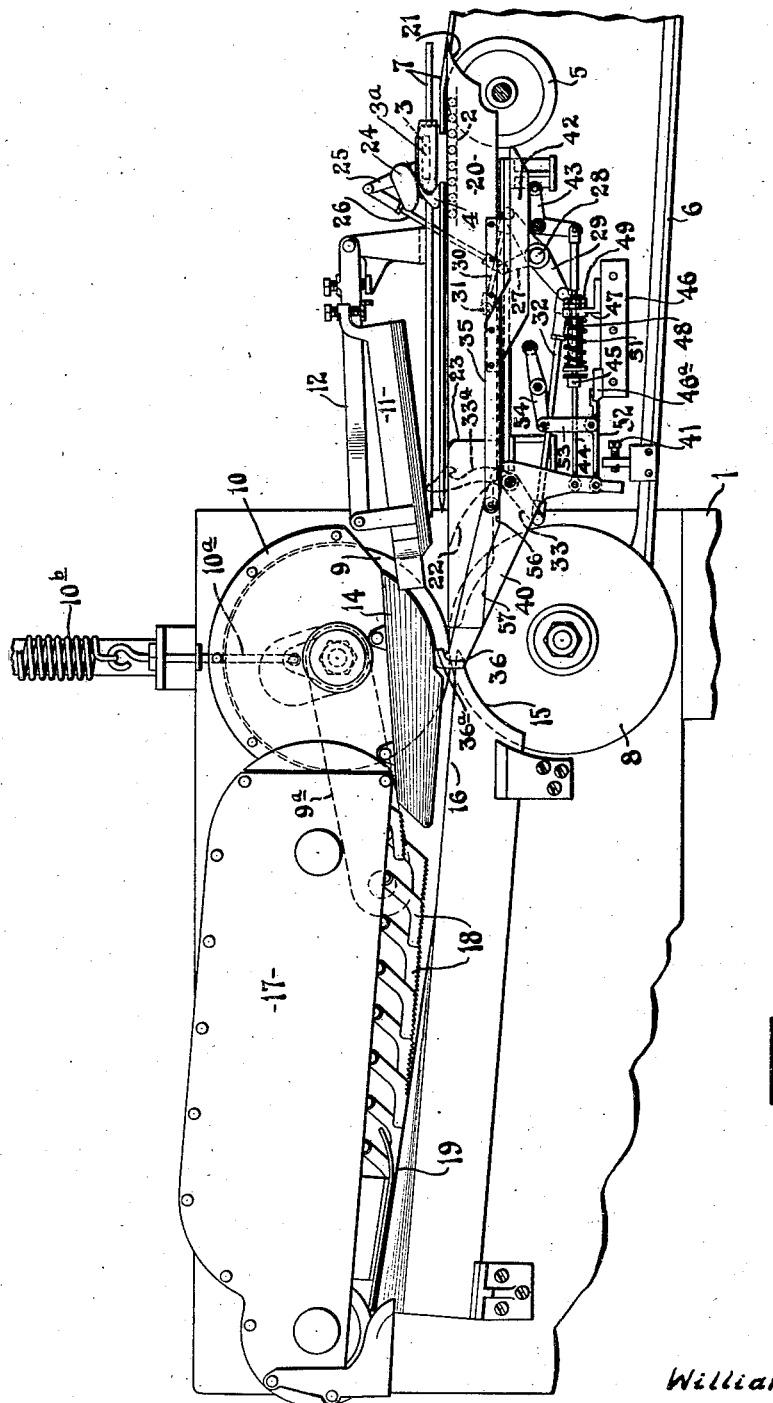
INVENTOR.
William H. Hunt
BY
Darby & Darby
ATTORNEYS

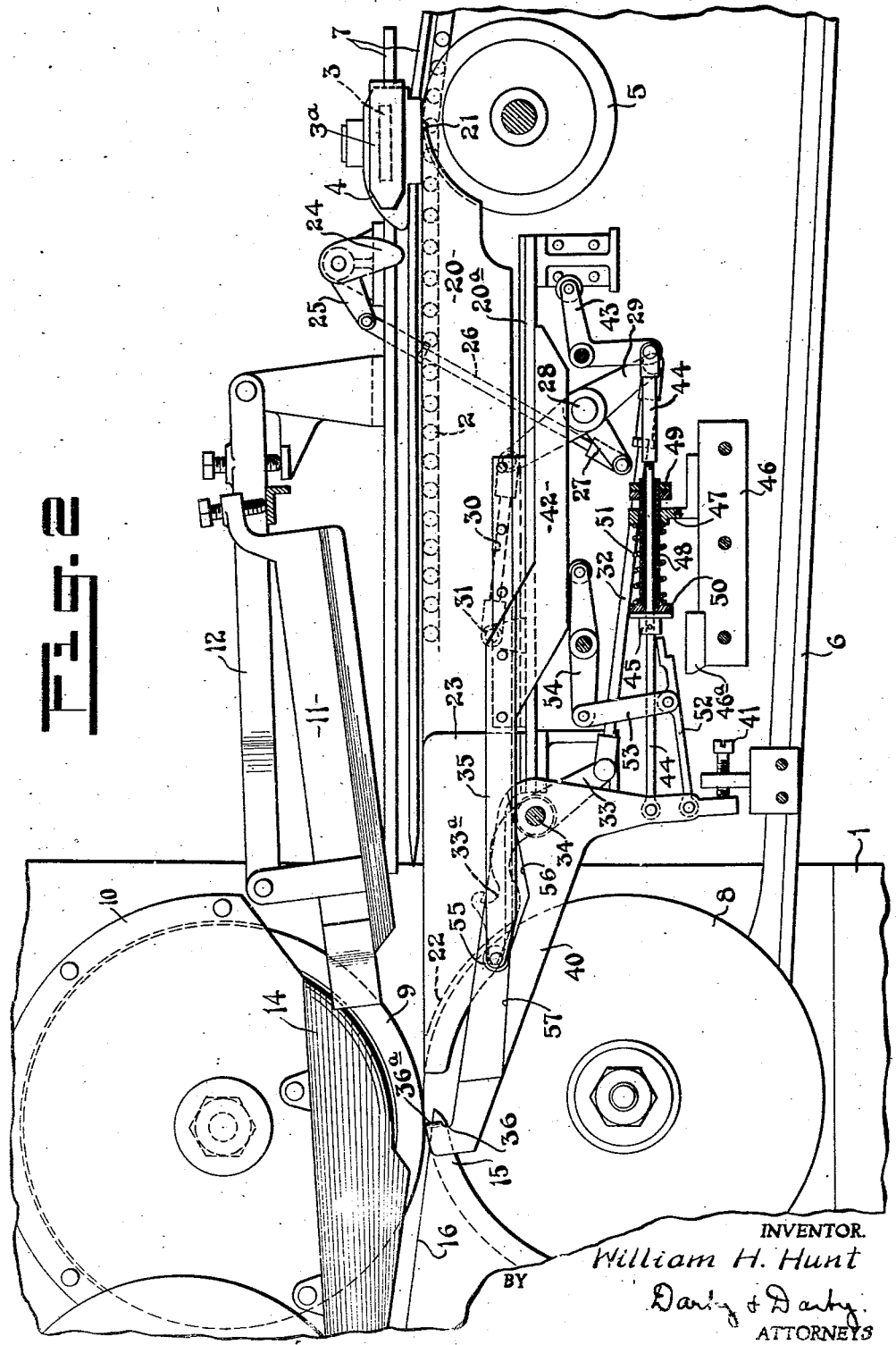

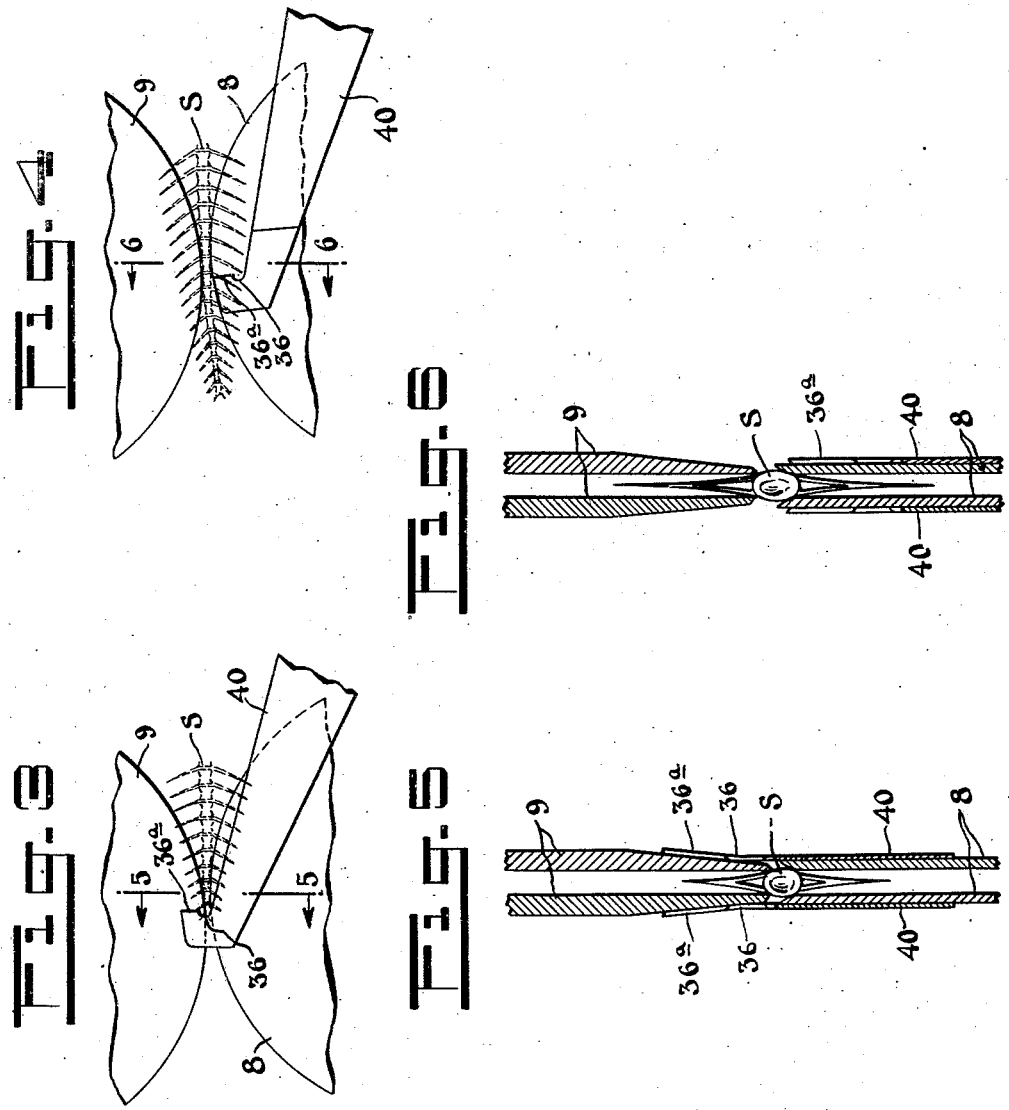

Feb. 28, 1939.  W. H. HUNT  2,149,022
FISH FILLETING MACHINE
Filed April 2, 1937  4 Sheets-Sheet 4
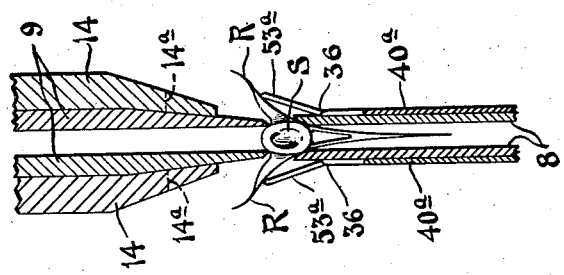
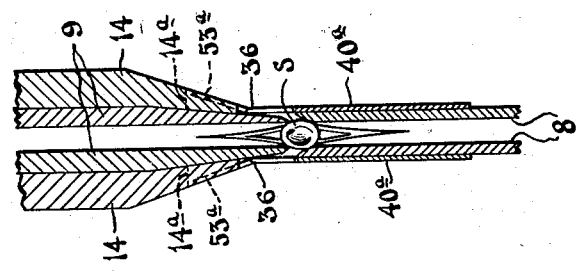
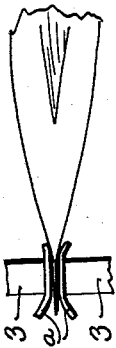
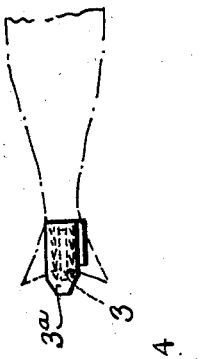
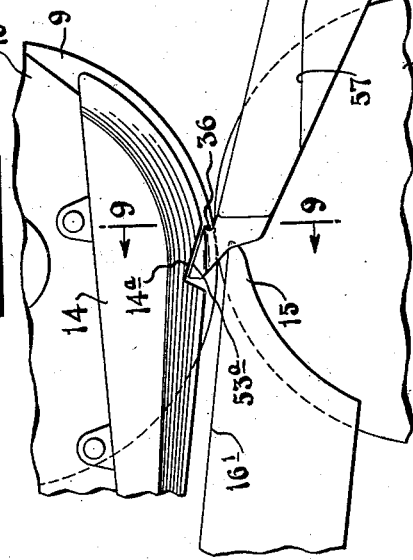
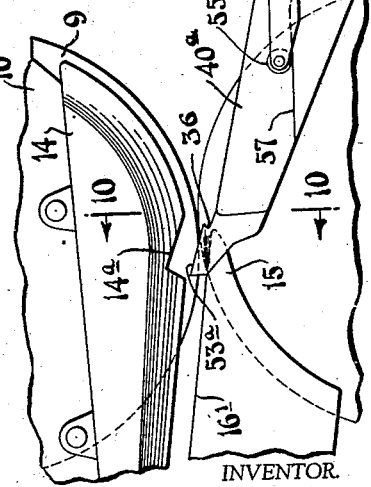
INVENTOR.
William H. Hunt
BY Darby & Darby.
ATTORNEYS Patented Feb. 28, 1939

2,149,022

UNITED STATES PATENT OFFICE 2,149,022

FISH FILLETING MACHINE

William H. Hunt, National City, Calif., assignor to Fish Machinery Corporation, San Diego, Calif., a corporation of California Application April 2, 1937, Serial No. 134,542

15 Claims. (Cl. 17—3)

This invention relates to improvements in fish filleting machines of the type disclosed in United States patent application Serial No. 754,727, filed November 26, 1934, in the name of William H. Hunt.

The main object of the invention is to provide an attachment for a machine of the type disclosed in the above application involving a device for cutting the two small pieces of skin at the tail of the fish which frequently remain uncut by a machine of the type of the application when the fillets are being formed.

Another object of the invention is to provide an automatic apparatus operating in conjunction with the filleting machine of said application for accomplishing this purpose.

These and many other objects as will appear from the following disclosure are secured by means of this invention.

This invention resides substantially in the combination, construction, arrangement and relative location of parts, all as will be described in greater detail in the following specification.

In the accompanying drawings,

Figure 1 is a side elevational view of a portion of a filleting machine of the type described in the application mentioned above;

Figure 2 is a somewhat similar view enlarged and with some parts broken away showing the apparatus in a different position;

Figure 3 is an enlarged detail view showing the attachment of this invention positioned to cut the skin at the tail of the fish by means of which the fillets are attached thereto and showing the position of the skeleton of the fish just at the time the skin is cut;

Figure 4 is a similar view with the skeleton further advanced and with the skin cutting hooks retracted;

Figures 5 and 6 are cross-sectional views taken on the lines 5—5 and 6—6 of Figures 3 and 4, respectively;

Figure 7 is a view similar to Figure 4 showing a modified form of skin cutting hook;

Figure 8 shows a skin cutting hook retracted;

Figures 9 and 10 are cross-sectional views taken on the lines 9—9 and 10—10 of Figures 7 and 8, respectively;

Figure 11 is an end elevational view of one of the tail gripping plates showing a fish in broken outline in relation thereto; and Figure 12 is a top plan view of the complete tail gripping device showing a fish in outline, diagrammatically.

Only sufficient of the parts of the machine disclosed in the above application are duplicated here to show the relationship of the device of this invention thereto. A brief review of the operation of the machine of the application will aid in understanding the object of this invention and the manner in which it is accomplished. In that machine the fish to be filleted are fed into the machine one at a time, back down and tail forward. They are introduced into the machine so that a pair of tail gripping devices engage the tail on opposite sides and clamp it therebetween. These devices are mounted on a carrier such as a pair of chains so as to move during their gripping action on a horizontal plane away from the feeding point. Their movement carries the fish along with them back down so as to engage a pair of parallel disc knives mounted to revolve at high speed on an axis below the plane of movement of the clamping devices so as to engage the fish at the back and to make parallel incisions beginning at the tail end. These incisions are made on opposite sides of the back spikes closely contiguous thereto and up to the backbone at the base of the spikes. These incisions extend all the way to the head end of the fish (it having preferably been headed) and just after the initiation of these incisions a pair of pointed rails are moved against the direction of the movement of the fish so that their pointed ends enter the incisions and engage the backbone.

The tail gripping devices continue in their movement so as to draw the fish onto the rails so that its backbone rests thereon and is guided thereby. These rails comprise a pair of parallel plates sharpened on their upper edges, and the back spikes and back fins, which have been previously picked up and guided into a plane between the back slitting knives, travel between the rails. The fish is then guided along the rails up to a pair of belly slicing disc knives which are positioned to rotate on an axis above the plane of movement of the gripping devices. These knives are rotatably supported on a pivotally mounted lever so that when the tail of the fish first engages them they are pushed upwardly about the pivot point of the lever. A spring suspension is provided for the knives at the outer end of the lever. Just before the fish reaches these knives the belly fins are engaged by a straightening device which straightens them into a plane so they may pass between the belly slicing knives. Rotatably mounted under these knives are a pair of discs which engage in the back incisions and aid in continuing the movement of the fish, the gripping devices having now disengaged it. About the time the gripping devices disengage the tail of the fish the rails are given a movement towards the belly slicing knives to insure the feeding of the fish sufficiently thereinto so that they, together with the traction discs, both of which are revolving at high speed will cause the fish to travel through them. The belly slicing knives make a pair of parallel incisions closely contiguous to and on opposite sides of the belly spikes up to the backbone. These knives continue their cut until they reach the belly cavity and travel on through it as the fish moves through them.

These incisions leave the fillets attached to the ribs of the fish. As the fish leaves the last pair of knives it moves onto a pair of pointed parallel rails which are sharpened at the points and on their top edges. The pointed ends enter the incisions in the back and the sharper upper edges cut the flesh from the sides of the backbone, these rails being spaced sufficiently so that the backbone may move between them. The fish is next gripped by feeding devices which engage in the belly cavity and move the fish onto a pair of ribbing knives, as shown in the application, which are so shaped as to scrape the flesh from the sides of the ribs.

In the operation of this machine because the belly slicing knives can swing upwardly a short distance when the fish first engages them at the tail end, they sometimes fail to cut completely through to the incisions in the back of the fish at the base of the tail, thus leaving there a small strip of flesh and skin on each side of the tail where it narrows down towards the tail fin. The presence of these strips of flesh and skin interferes with a successful completion of the operations to follow and particularly the ribbing operations. An object of this invention is to cut these strips of flesh and skin so that when the fish leaves the belly slicing knives and the traction discs it will be in proper condition for the following operations which complete the formation of the fillets.

Referring to the drawings, there is shown a portion of the frame of the machine at 1 on which is supported a pair of endless chains 2, only a portion of one of which is shown. These chains operate in parallel planes over pairs of sprockets at each end. Secured to the chains at spaced intervals are what may be termed traveller members 4 which provide guide bearings for the transversely movable bars 3. The traveller members are, of course, attached to the pairs of chains in oppositely disposed pairs and the bars are caused at the proper times to move towards and away from each other in the carrier members by cam mechanism, not shown. The adjacent ends of the bars are provided with roughened gripping plates 3ª for engaging the tail of the fish, as shown in the application mentioned above. Figures 11 and 12, which are quite diagrammatic, clearly show the relationship of the fish to the tail gripping devices. With respect to these figures the fish is moved by the tail gripping devices to the left, that is, in the direction of its length, with its tail end leading. The fish, as is clear from these figures, is back down. At 5 is shown one of the circular back slicing knives mounted for rotation at proper speed. At 6 and 7 are shown additional portions of the frame which form guides for the carrier members 4. At 8 are the traction discs rotatably supported below the plane of movement of the fish and at 9 are the belly slicing knives which are rotatably journaled on the end of a pivotally supported lever 9ª, see Figure 1, which is partially supported at its outer end by means of a rod 10ª and a spring 10ᵇ. Mounted on the lever is a housing 10 for the knives 9 and secured to this housing are a pair of deflecting plates 14. At 11 is illustrated in a general way the belly fin straightener which is pivotally supported on the end of a lever 12 so that the straightening device is above the plane of movement of the fish. At 15 are the pointed rails which have the upper edges sharpened, as indicated at 16. These rails are aligned with the ribbing knives 19, which are generally illustrated here but shown in full detail in the above application. Mounted above the sharpened rails 15 and the ribber knives 19 is a housing 17 in which the feeding device, including the belly cavity engaging fingers 18, is mounted. These fingers engage the fish and move it along in the direction of its length.

The guide rails which enter the back incisions are shown at 20. The ends adjacent the back cutting knives 5 are shown pointed and sharpened as indicated at 21 and the opposite ends are pointed as shown at 22. There are a pair of these rails supported in spaced relation by suitable mechanism in guideways 20ª so they may be reciprocated in the direction of their length. The pointed ends 22 move on opposite sides of a pair of plates 23, projecting so as to overlap the outer faces of the traction discs 8, as is clear from Figure 2. Mounted at the sides of the paths of travel of the chains 2 in a position to be engaged by the carrier members 4, which are formed to have camming surfaces, are a pair of cam followers 24, only one of which is shown in Figure 2. This cam follower is mounted on a short shaft, to which a lever 25 is connected. This lever in turn is connected by a link 26 to a lever 27 on a shaft 28 to which is also attached a lever 29 extending from both sides of the shaft. The upper end of lever 29 is pivotally connected by a link 30 to the rails 20 at the pivot points 31. The lower end of lever 29 is connected by a link 32 to an arm 33 secured to a shaft 34 journaled on a suitable part of the machine. Secured to this shaft for movement with it is an upwardly projecting cam follower 33ª to be engaged by the carrier members 4 at the proper time.

Mounted for rotation on the shaft 34 are the hook members or levers 40 comprising a portion of this invention. There are a pair of these disposed on opposite sides of the traction discs and circular knives 9. The hook members are in the form of bell-crank levers, the lower ends of which are positioned to be engaged by adjustable stop screws 41. Secured to the rails 20 for movement therewith is a cam piece 42 projecting therebelow and positioned to engage the cam follower mounted on the bell-crank lever 43 pivotally supported on a suitable part of the machine. This bellcrank lever is connected by a link 44 to the downwardly projecting arm of the hook lever 40. Secured to the link 44 is a collar 45. The link 44 passes through a fixed bracket 47 mounted on a suitable supporting plate 46 and is enclosed by a tubular sleeve 48 which is provided with stop collars 49 secured thereto and a head piece 50 at the other end. The head piece is positioned to be engaged by the collar 45 and the collars 49 are positioned to engage the bracket 47. A coil spring 51 surrounds the tube 48 and lies between the bracket 47 and the head piece 50.

A latch member 52 is pivotally mounted on the hook lever 40 and is pivotally connected by a link 53 to an arm 54 pivotally supported on a suitable part of the machine and provided with a cam follower on its terminal end. This cam follower is positioned to engage the cam piece 42. A pair of arms 35 are secured to the rails 20 for movement therewith and terminate in cam followers 55 positioned to engage the camming surfaces 56 and 57 formed on or attached to the hook members 40. The upper arms of the hook members are formed as shown at 36 to provide hook-like portions 36, the function of which will be described later.

In the operation of this mechanism, a fish is fed into the machine so that the tail gripping plates 3ª clamp the tail therebetween by engaging the opposite sides thereof. The fish is introduced into the machine back down. The chains 2 which move the carrier members 4 and the tail gripping devices, which are attached to the bars 3, pull the fish over the pair of parallel back slicing knives 5 so as to make parallel incisions along the back of the fish on opposite sides of the back spikes closely contiguous thereto and up to the backbone. Just before the fish reaches the knives 5 the back fins are engaged by a fin straightening device, not shown, which straightens them into a plane between the knives 5. Immediately after the initiation of these incisions, the carrier members 4 engage the cam followers 24 and move them from the position shown in Figure 2 to the position shown in Figure 1. This causes the rails 20 to move against the direction of movement of the fish so that the pointed ends enter the incisions. The back fins travel between the rails 20. As the fish continues its movement towards the left, completing the back incisions to the head end, the backbone of the fish at the base of the slits thus formed engages the top edges of the rails 20 so that the fish is guided thereby and the backbone straightened if it is crooked. The fish is then pulled along the rails until its tail gets in the region of the belly slicing knives 9. As the fish passes under the straightening device 11, its belly fins are straightened into a plane which lies between the knives 9. At the time the carrier member 4 engaged the cam follower 24 to move the rails the hook member 40 was simultaneously moved from the position shown in Figure 2 to the position shown in Figure 1, by the engagement of the cam follower on bell-crank lever 43 with the adjacent camming surface of the cam 42. The cam follower on lever 54 is at the same time released from the cam 42 so that the latch member 52 drops down into engagement with the stop 46ª to hold the hook member in raised position.

As the tail of the fish arrives at the knives 9 the carrier members 4 of the gripping devices acting on that particular fish engage the lever 33ª to rotate shaft 34 in a counter-clockwise direction and thereby cause the movement of the rails 20 from the position shown in Figure 1 to the left to the position shown in Figure 2 by means of the interconnecting mechanism. This movement of rails 20 aids in moving the fish into feeding engagement with the traction discs 8 and the belly cutting knives 9. As the tail end of the fish moves between the traction discs 8 and knives 9 the knives 9 are pushed upwardly about the pivot support of the lever 9ª. The result of this is that a small strip of skin and flesh on each side of the tail at the base thereof frequently is not engaged by the knives. It is this feature of operation of the machine of the application with which this invention is concerned. The hook members being in raised position, as shown in Figure 1, engage these strips of skin and flesh and for an instant stop the movement of the tail of the fish.

At the time the fish is being pulled along by the tail gripping devices it is somewhat elongated and particularly in the region of the base of the tail, so that when the strips of skin engage the hook members to stop the tail the main body of the fish continues to move, with the result that the previously elongated portions are contracted. In addition the fish are sufficiently soft and compressible so that they are still further capable of absorbing the continued movement of the main body of the fish while the strips of skin and flesh are being cut.

The fillets partially formed by the back incisions overlie the outer faces of the hook levers 40 while the tail of the fish is between them. The result is that the small strip of skin on each side of the tail engages the hook as 36. The knives 9, revolving at high speed and not being completely counter-balanced by the spring 10ᵇ, sink down into the flesh at the tail of the fish and cut these strips off. This immediately releases the fish and the traction action of the discs 8 and the knives 9 draw it through them.

The parts are so proportioned and timed in their operation that the cutting of the skin strips at the base of the tail is accomplished before the completion of the movement of the rails 20 towards the knives 9. Just after this cutting action the continued movement of the rails causes the cam followers 55 to move from the cam surfaces 56 up the inclined portions thereof to the camming surfaces 57 and thereby depressing the hook ends of the hook arms 40. Immediately after the cutting of the skin, as noted above, the fish begins to move and its movement continues as the edges 36ª are swinging downwardly on an arc about the center of shaft 34 and they therefore have the desirable function of cutting or stripping the flesh from the sides of the backbone. The important point with regard to this feature is that the edge 36ª is desirably pulled below the level of the backbone before the skeleton of the fish advances to the point where the edge 36ª will engage the ribs. It is to be noted that before the cam follower 55 reaches the point to cause any depression of the hook arm 40 the cam follower on arm 54 has been engaged by the adjacent end of the cam 42 so as to raise the latch member out of engagement with the stop 46ª from the position shown in Figure 1 towards the position shown in Figure 2. It may be noted that the latch member is provided to prevent the hook member from being depressed for any reason as the tail of the fish enters between the traction discs and the knives. The traction discs and knives then continue the movement of the fish onto the pointed ends 15 and the cutting edges 16 of the forward portions of the ribbing knives. The following fish is in a position as the preceding fish completes its movement through the knives 9 so that the carrier members of the grippers, which are pulling the following fish, are about to engage the cam followers 24. The above described operation will become clear when considered in connection with Figures 3 to 6, inclusive.

The operation of the modified form of device is illustrated in detail in Figures 7 to 10 inclusive. In this arrangement the hook ends of the levers 40ᵃ are flared outwardly, as shown in Figure 9, and in raised position move into the notches 14ᵃ on the side plates 14. The actuation of the rails is the same as that previously described, and the operation of the hook arms 40ᵃ to the raised position shown in Figure 7 is the same as that previously described. When the tail of the fish moves into the knives 9 and they are raised as before, the strips of skin at the tail engage in the hooks 36, stopping the tail of the fish for a moment so that the rotating knives may sink down into the fish and cut these strips. The rails are moving at this time and, as the strips of skin are cut, the cam follower 55 moves from the cam surface 56 up the inclined portion onto the cam surface 57, at which time, as is shown in Figure 8, the edge 53ᵃ of the hook portion is moved to the position shown in Figure 8. Thus the first point of difference of this arrangement over that of the previous one is that the hook members do not move below the plane of the backbone but are positioned so as to be opposite the sides of the backbone, as indicated in Figure 3. At this time the lower end of the hook lever 40ᵃ is in the dotted position shown in Figure 7 and not engaging the stop screw 41. At this time the collar 45 just engages the head piece 50 so that any further movement of the hook arm 40ᵃ from the position shown in Figure 8 is against the resistance of spring 51. As the fish moves through the knives 9 the edges 53ᵃ ride along the sides of the backbone, severing the meat attached thereto, which action continues until the ribs R of the fish skeleton S engage the outwardly flared ends of the hook members as illustrated in Figure 10.

When the fish being treated are small the rib structure will ride along the flared portions 53ᵃ of the hook members without depressing them but in the case of larger fish the rib structure may be so large that it cannot easily get past the flared ends of the hook members. It is for this reason that the structure is arranged to make provision for additional downward movement of the hook members to accommodate the larger rib structures. Thus, in the case of larger fish, engagement of the ribs with the flared ends will depress the hook members against the resistance of spring 48. In other words, this structure provides the necessary resilience or extra play of the parts to accommodate larger fish. The upper edge of the forward portions of the ribbing knives need not be especially adapted for cutting with the form of hook member and, therefore, may be sharpened or not as desired at the portions 16' in Figure 7.

It is to be noted that as a matter of actuality the spring structure, although illustrated in Figures 1 and 2 as being used with the form of hook member shown therein, is not necessary to the operation of that form. Its presence, however, does not interfere with the operation of that form. To state it another way, the arrangement of Figures 1 and 2 is adapted to use either form of hook member shown.

It is further noted that the hook portions 36 may be sharpened so that the strips of skin and flesh may be cut thereat as the traction discs and belly cutting knives tend to pull the fish ahead. It is of course apparent that these hook members may take many other forms than those particularly illustrated. It is emphasized that it is within the scope of this invention to have these members cut the strips of flesh either alone or in conjunction with the belly slicing knives.

From the above description it will be apparent that this invention resides in certain principles of construction and operation which may be varied without departure from the scope of the invention. I do not, therefore, desire to be strictly limited to the disclosure as given for purposes of illustration, but rather to the scope of the appended claims.

What I claim is:

1. In a machine for filleting fish, the combination with means for forming a pair of parallel incisions in the back of a fish on opposite sides of the back spikes and closely contiguous thereto and movably supported means for making a pair of parallel incisions in the belly side of the fish on opposite sides of the belly spikes and closely contiguous thereto whereby a small strip of skin on each side of the fish at the base of the tail is left uncut, of means for engaging said strips of skin while said belly slicing means cuts them.

2. In a fish filleting machine, the combination with means for engaging a fish at its tail and advancing it in the direction of its length, tail first and back down, means for forming a pair of incisions in the back of the fish as it is advanced, and movably supported means for making a pair of incisions in the belly side of the fish as it is advanced whereby a small strip of skin is left uncut at the base of the tail on each side by reason of the movement of said last mentioned means away from the fish when engaged thereby, of means for engaging the fish at said strips of skin and stopping its motion while said last mentioned cutting means severs them.

3. In a fish filleting machine the combination with means for engaging a fish at its tail and advancing it in the direction of its length, tail first and back down, means for forming a pair of incisions in the back of the fish as it is advanced, and movably supported means for making a pair of incisions in the belly side of the fish as it is advanced whereby a small strip of skin is left uncut at the base of the tail on each side by reason of the movement of said last mentioned means away from the fish when engaged thereby, of means for engaging the fish at said strips of skin and stopping its motion while said last mentioned cutting means severs them as it returns to its original position, and means operated by said first engaging means for moving said skin engaging means into position to engage the strips of skin and to move said second engaging means out of that position after the skin is severed.

4. In a fish filleting machine, the combination with means for engaging a fish at its tail and advancing it in the direction of its length, tail first and back down, means for forming a pair of incisions in the back of the fish as it is advanced, and movably supported means for making a pair of incisions in the belly side of the fish as it is advanced whereby a small strip of skin is left uncut at the base of the tail on each side by reason of the movement of said last mentioned means away from the fish when engaged thereby, of means for engaging the fish at said strips of skin and stopping its motion while said last mentioned cutting means severs them, and means operated by said first engaging means for moving said skin engaging means into position to engage the strips of skin and to move said second engaging means out of that position after the skin is severed and for moving said skin engaging means to a position to scrape along the sides of the backbone of the fish after the severing operation.

5. In a fish filleting machine the combination with means for incising a fish in two parallel planes closely contiguous to its back and belly spikes on opposite sides thereof up to the backbone while leaving skin strips uncut at the base of the tail on both sides, of means for cutting said skin strips.

6. In a fish filleting machine the combination with means for incising a fish in two parallel planes closely contiguous to its back and belly spikes on opposite sides thereof up to the backbone while leaving skin strips uncut at the base of the tail on both sides and a conveyor for moving the fish therethrough, of means projected and retracted by said conveyor for engaging the skin strips, when projected, while said first means cuts them.

7. In a fish filleting machine the combination with means for incising a fish in two parallel planes closely contiguous to its back and belly spikes on opposite sides thereof up to the backbone while leaving skin strips uncut at the base of the tail on both sides and a conveyor for moving the fish therethrough, of a pair of hook levers movable into and out of the path of movement of said fish, and means actuated by said conveyor for effecting movement of the hook members in proper timed relation with the movement of the fish.

8. In a fish filleting machine the combination with means for incising a fish in two parallel planes closely contiguous to its back and belly spikes on opposite sides thereof up to the backbone while leaving skin strips uncut at the base of the tail on both sides and a conveyor for moving the fish therethrough, of a pair of hook levers movable into and out of the path of movement of said fish, means actuated by said conveyor for effecting movement of the hook members in proper timed relation with the movement of the fish, and means for resiliently resisting further movement of said hook members from their retracted position.

9. In a fish filleting machine the combination with means for incising a fish in two parallel planes closely contiguous to its back and belly spikes on opposite sides thereof up to the backbone while leaving skin strips uncut at the base of the tail on both sides and a conveyor for moving the fish therethrough, of means projected and retracted by said conveyor for engaging the skin strips, when projected, to stop the motion of said fish while said first means cuts them, said means scraping along the sides of the backbone while being retracted to detach the fillets therefrom.

10. In a fish filleting machine the combination with means for incising a fish in two parallel planes closely contiguous to its back and belly spikes on opposite sides thereof up to the backbone while leaving skin strips uncut at the base of the tail on both sides and a conveyor for moving the fish therethrough, of a pair of hook levers movable into and out of the path of movement of said fish, and means actuated by said conveyor for effecting movement of the hook members in proper timed relation with the movement of the fish, said hook members scraping along the sides of the backbone while being retracted to detach the fillets therefrom.

11. In a fish filleting machine the combination with means for incising a fish in two parallel planes closely contiguous to its back and belly spikes on opposite sides thereof up to the backbone while leaving skin strips uncut at the base of the tail on both sides and a conveyor for moving the fish therethrough, of a pair of hook levers movable into and out of the path of movement of said fish, means actuated by said conveyor for effecting movement of the hook members in proper timed relation with the movement of the fish, and means for resiliently resisting further movement of said hook members from their retracted position, said hook members scraping along the sides of the backbone while being retracted to detach the fillets therefrom.

12. A method of filleting fish including the steps of advancing a fish in the direction of its length, tail first and back down, cutting the fish in planes up to the backbone from the back and belly sides on opposite sides of the back and belly spikes and closely contiguous thereto, leaving the skin uncut in a small strip on each side of the tail at its base, cutting said strips, and scraping the meat from the sides of the backbone to the ribs.

13. A method of filleting fish including the steps of advancing a fish in the direction of its length, tail first and back down, cutting the fish in planes up to the backbone from the back and belly sides on opposite sides of the back and belly spikes and closely contiguous thereto, leaving the skin uncut in a small strip on each side of the tail at its base, cutting said strips while the fish is at rest, and scraping the meat from the sides of the backbone to the ribs.

14. A method of filleting fish including the steps of advancing a fish in the direction of its length, tail first and back down, cutting the fish in planes up to the backbone from the back and belly sides on opposite sides of the back and belly spikes and closely contiguous thereto, leaving the skin uncut in a small strip on each side of the tail at its base, stopping the movement of the fish, cutting through said strips, and scraping the meat from the sides of the backbone to the ribs.

15. In a fish filleting machine the combination with means for incising a fish in two parallel planes closely contiguous to its back and belly spikes on opposite sides thereof up to the backbone while leaving skin strips uncut at the base of the tail on both sides and a conveyor for moving the fish therethrough, of a pair of cutting members movable into and out of the path of movement of said fish, and means actuated by said conveyor for effecting movement of the cutting members in proper timed relation with the movement of the fish.

WILLIAM H. HUNT.